RADIO TRANSMISSION SYSTEM HAVING A HIGH SIGNAL-TO-NOISE RATIO

Original Filed July 30, 1948

INVENTOR.
JOHANNES MEYER CLUWEN
BY Fred M Vogel
AGENT

Nov. 2, 1954 J. M. CLUWEN 2,693,577

RADIO TRANSMISSION SYSTEM HAVING
A HIGH SIGNAL-TO-NOISE RATIO

Original Filed July 30, 1948 2 Sheets-Sheet 2

INVENTOR.
JOHANNES MEYER CLUWEN

BY Fred M Vogel

AGENT.

United States Patent Office 2,693,577

Patented Nov. 2, 1954

2,693,577

RADIO TRANSMISSION SYSTEM HAVING A HIGH SIGNAL-TO-NOISE RATIO

Johannes Meyer Cluwen, Eindhoven, Netherlands, assignor to Hartford National Bank and Trust Company, Hartford, Conn., as trustee Application September 22, 1950, Serial No. 186,192

Claims priority, application Netherlands September 3, 1947

1 Claim. (Cl. 332—45)

The present application is a division of my copending U. S. Patent application Ser. No. 41,674 filed July 30, 1948, now abandoned.

This invention relates to a radio-transmission system, in which the ratio existing between the signal to be transmitted and produced in the output circuit of the detector of the receiver, and the interference voltages produced in this output circuit, which may be due to atmospherics, amplification noise and so forth, exceeds the value hitherto attained in radio transmission systems.

According to the invention a radio-transmission system comprising a transmitter having a modulator stage to which the audio-frequency oscillations to be transmitted are supplied, is provided with means by which the radio-frequency spectrum radiated by the transmitter is distorted, whilst suppressing at least the central frequency of the radiated oscillations, in such manner that when detecting these oscillations in a receiver (which otherwise does not comprise means for relatively amplifying the central frequency to the initial level with respect to the sideband frequencies) an audio-frequency oscillation which is similar to the audio-frequency oscillation fed to the modulator stage of the transmitter, can be taken from the output of the detector forming part of the receiver.

The invention is based on the realisation that relative noise suppression is obtainable by suppressing that part of the transmitted frequency band which in itself does not or substantially not contribute to an audio-frequency output signal of the detector housed in the receiver. These parts invariably comprise the band in the immediate proximity of the central frequency of the oscillations transmitted, since the central frequency alone will never give rise to a detected audio-frequency signal. Suppression of the central frequency of the transmitted oscillation implies that the sideband frequencies determining the detected audio-frequency signal (the useful signal) may occur with a larger amplitude, if the output tube of the transmitter is swung out to the same value. Thus the useful sideband spectrum is relatively enlarged with respect to the noise spectrum which comprises chaotically distributed noise frequencies of a definite average energy.

In a single sideband transmitter it is generally known per se to suppress the carrier-wave frequency. However, a receiver tuned to such a transmitter should then comprise means by which this carrier-wave frequency is reduced to its former value relatively to the sideband frequencies. These means render the receiver complicated and expensive.

However, the invention provides at the same time means by which the spectrum radiated by the transmitter is distorted in such manner as to obtain the desired output signal with the use of a receiver not involving carrier-wave amplification.

Figure 8:
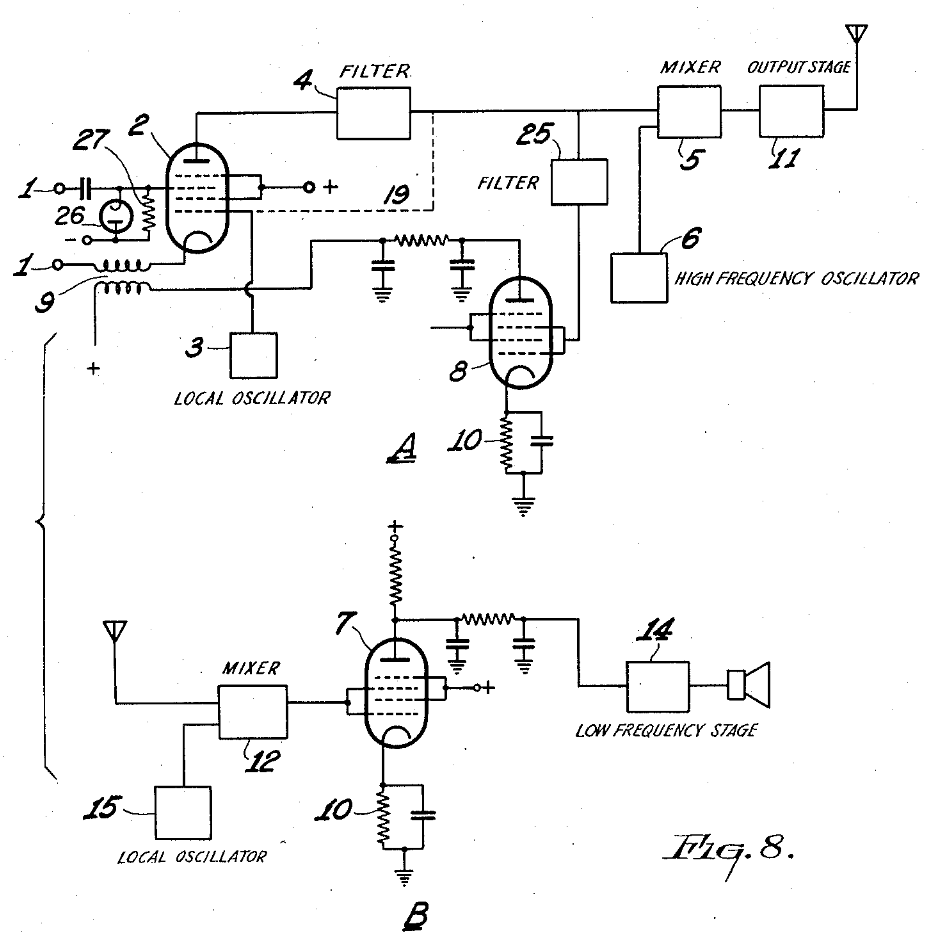
Figure 9:
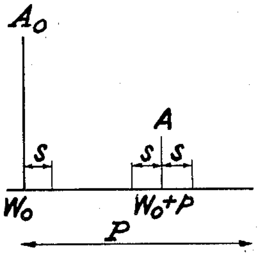

In order that the invention may be more clearly understood and readily carried into effect, it will now be described more fully with reference to the accompanying drawings, in which Figs. 1 to 7 show a transmission system with the use of frequency-modulated oscillations and Figs. 8 and 9 show a system with the use of oscillations modulated in such manner that detection of these oscillations by means of a detector having an even power characteristic curve yields the audio-frequency signal.

In the conventional transmission systems with the use of frequency-modulated oscillations that are limited and subsequently detected in the receiver, the influence of a noise frequency, for example one of the components of the noise spectrum, on the detected signal appears to be less than in transmitting amplitude-modulated oscillations. This is due to the fact that the active signal i. e. the frequency sweep of the frequency-modulated oscillation, may be chosen to be very great relatively to the phase-modulation inflicted by the noise frequency upon the signal to be transmitted, whereas in transmitting amplitude-modulated oscillations the active signal cannot yield a modulation depth exceeding 100%, so that a limit is set to the signal-to-noise ratio.

Assuming the influence of a noise frequency having an amplitude S and a frequency-difference with respect to the central frequency $W_0$ of a frequency-modulated oscillation to be $s$. If the amplitude of this noise frequency is small relatively to the amplitude of the carrier-wave, which will be assumed to be unity, it follows that the phase-modulation of the central frequency is equal to $S \sin (st+a)$ (Fig. 1), to which corresponds a detected signal $sS \cos (st+a)$. From this expression it appears that according as the noise frequency exhibits a greater frequency difference $s$ with the carrier-wave, the corresponding detected noise signal has a higher frequency. Assuming that frequencies exceeding a given maximum frequency, for example 15 kc./s., are no longer passed by the low-frequency stage of the receiver, it follows that noise frequencies which are spaced more than 15 kc./s. from the carrier-wave frequency do not give rise to a detected noise signal.

This only applies as long as the carrier-wave is not modulated in frequency. With a frequency-modulated carrier-wave having an instantaneous phase-angle of $$\frac{z}{p} \sin pt$$

a noise frequency S in the detected signal will become manifest as a term=

$$S \sin \left(a+st-\frac{z}{p} \sin pt\right)$$

(Fig. 2) i. e. a frequency-modulated oscillation having a central frequency $s$ and an instantaneous phase angle $$\frac{z}{p} \sin pt$$

Consequently, in the case of a modulated oscillation, a noise signal likewise produces a noise if the frequency is spaced more than say 15 kc./s. from the carrier-wave frequency. Considering all the noise frequencies contributing to one and the same low-frequency noise signal $s$, it is found that the noise frequency $W_0+s$ and $W_0-s$ respectively contributes for a part $$J_0\left(\frac{z}{p}\right)$$

the noise frequency $W_0+s+p$ and $W_0+s-p$ and $W_0-s+p$ and $W_0-s-p$ respectively, for a part $$J_1\left(\frac{z}{p}\right)$$

and so forth, in which $J_0$, $J_1$ and so forth designate the Bessel functions of the 0°, 1° order and so forth. Assuming for the phase angle $a$, at which these noise frequencies occur a chaotic distribution and for the amplitude of these noise frequencies an average value S, it follows that the average square of the amplitude, with which the noise frequency $s$ in the detected signal occurs, has a value $$s^2S^2J_0{}^2+2s^{2\circ\circ}J_k^2=s^2S^2$$

It consequently appears that the noise frequencies contributing to a detected noise signal falling within the acoustic frequency-range are distributed throughout the frequency range occupied by the frequency-modulated signal and, in the case of a chaotic distribution of the phase angle and the amplitude of these noise frequencies yield an average square of the amplitude of the low-frequency detected noise signal (i. e. average noise energy), which assumes the value $s^2S^2$ independently of the frequency-sweep of the active signal.

Figures 1, 2, 3A, 3B, 3C, 4, 5, 6, 7:
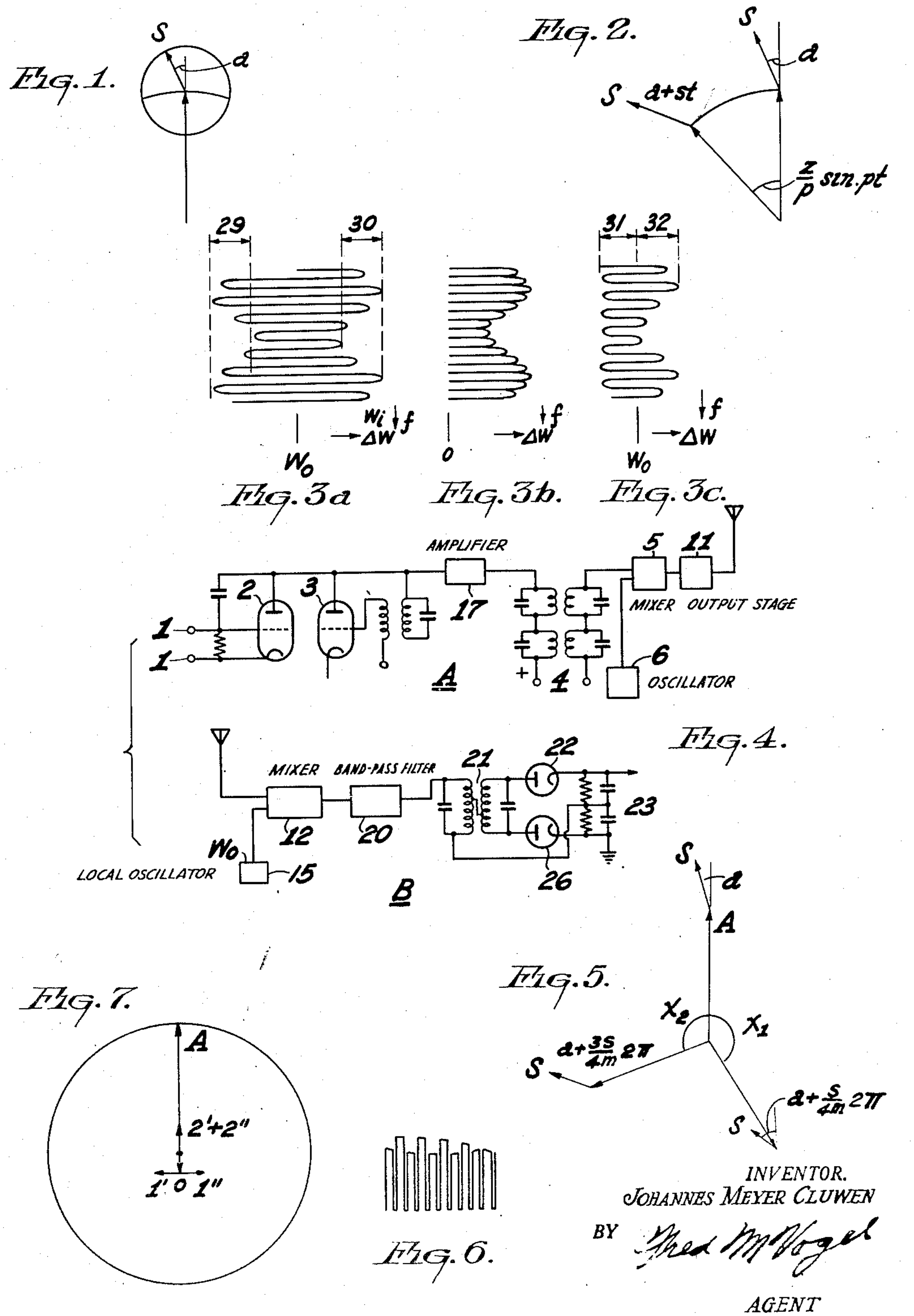

The means according to the invention permit the energy of the detected noise signal to be reduced to a certain degree. To this end a frequency-modulated oscillation is radiated at the transmitter end of a frequency-modulation transmission system of which oscillation the modulating oscillation controlling the frequency-sweep is formed by an intermediate-frequency oscillation which is modulated in amplitude with the signal to be transmitted (Fig. 3*a*). Band-pass filters are provided by which the bands near the central frequency, inclusive of the latter, are completely suppressed, and at the receiver end this frequency-modulated oscillation is mixed with a frequency which coincides, for example, with the central frequency $W_0$ of the frequency-modulated oscillation, the mixing oscillation produced (Fig. 3*b*) being subsequently supplied through a band-pass filter to a frequency detector, of which the rectifying part is preferably constructed in the form of a peak voltage detector.

Fig. 4 shows the circuit diagram of a transmitter A and of a receiver B for such frequency-modulated oscillations.

The audio-frequency signal to be transmitted is supplied through terminals 1, 1 to a modulator stage 2 (for example a reactance tube) of a frequency-modulated oscillator 3. The oscillations produced are fed, if desired after frequency-multiplication and amplification in a stage 17, to a filter 4 which passes only a part of the frequency spectrum produced and suppresses at least the central frequency of the oscillation produced. Then the output oscillations of this network are mixed, in a mixer stage 5, with radio-frequency oscillations from an oscillator 6 and supplied through an output stage 11 to the transmitter aerial. In the mixer stage 12 of the receiver B the oscillations radiated are mixed with oscillations from a local oscillator 15, of which the frequency coincides, for example, with the central frequency $W_0$ of the incoming frequency-modulated oscillations. These oscillations are amplified and limited in amplitude in an intermediate-frequency amplification stage comprising a band-pass filter 20, whereupon the limited oscillations are converted, by means of a discriminating network 21, into intermediate-frequency oscillations, of which the instantaneous amplitude varies approximately in the manner shown in Fig. 3*b*. This amplitude-modulated oscillation is detected with the use of a push-pull detector 22 which is preferably constructed as a peak detector. The oscillation produced across the output circuit 23 of the detector 22 will, in effect, then form the envelope of the oscillation illustrated in Fig. 3*b*, which envelope corresponds to the desired incoming oscillation. As appears from the following such a system not only permits of reducing, for example by a factor 8, the influence of noise interferences, but also yields the remarkable advantage of suppressing the influence of image-frequency signals and reducing the influence of a neighbouring, similarly modulated transmitter relatively to the systems hitherto known.

Fig. 5 illustrates the phase diagram of a frequency-modulated oscillation $\cos(W_0t+X(t))$ in which the vector A corresponds to the central frequency $W_0$ and in which the phase, under the action of a modulating intermediate-frequency oscillation, exhibits a maximum deviation $X_1$ to the right and a maximum deviation $X_2$ to the left. Furthermore an interference having an amplitude S and a frequency-difference relatively to the central frequency $W_0$ is assumed to be present and at the instant 0 a phase difference *a* with the central frequency is assumed. If this signal is mixed with a frequency corresponding to the central frequency $W_0$, the interfering phase-shift corresponding to the maximum phase-shift to the right is found to be $$-S\sin\left(X_1+a+\frac{S}{4m}2\pi\right)$$

and $$-S\sin\left(X_1+a+\frac{5s}{4m}2\pi\right)$$

and . . . respectively, whereas that corresponding to the maximum phase shift to the left is found to be $$+S\sin\left(a+\frac{3s}{4m}2-X_2\right)$$

and . . . respectively. Imagining for a moment that the amplitude of the modulating intermediate-frequency oscillation is constant and, moreover, that this oscillation exhibits a block-shaped variation, the detected signal will exhibit a form as shown in Fig. 6 on enlarged scale. The noise signals corresponding to the two peaks may be represented by the terms:

$$\left(\frac{1}{2}+\frac{2}{\pi}\sin mt+\frac{2}{3\pi}\sin mt+\ldots\right)$$

$$\frac{d}{dt}-S\sin(X_1+a+St)=$$

$$\left(\frac{1}{2}+\frac{2}{\pi}\sin mt+\frac{2}{3\pi}\sin 3mt+\ldots\right).-sS\cos(X_1+a+st)$$

and $$\left(\frac{1}{2}-\frac{2}{\pi}\sin mt-\frac{2}{3\pi}\sin 3mt-\ldots\right).sS\cos(a+st-X_2)$$

respectively.

For the sum oscillation of the detected noise signal we find:

$$\frac{1}{2}sS\{\cos(a+st-X_2)-\cos(X_1+a+st)\}$$

$$-\frac{2}{\pi}sS\sin mt\{\cos(X_1+a+st)+\cos(a+st-X_2)\}$$

$$-\frac{2}{3\pi}sS\sin 3mt\{\ldots\}$$

$$=-sS\sin\left(a+st+\frac{X_1-X_2}{2}\right)\sin X$$

$$-\frac{4}{\pi}sS\sin mt.\cos\left(a+st+\frac{X_1-X_2}{2}\right)\cos X$$

$$-\frac{4}{3\pi}sS\sin 3mt.\cos\left(a+st+\frac{X_1-X_2}{2}\right)\cos X$$

in which $$X=\frac{X_1+X_2}{2}$$

The following noise frequencies with amplitudes $S_i$ and phase-angle $a_i$ of the total spectrum participate in producing a detected noise signal with a frequency *s*:

| High-frequency noise frequency | detected noise signal |
|---|---|
| $W_0+s$ . . . | $sS_1\sin X\sin(a_1+st)$ |
| $W_0-s$ . . . | $sS_2\sin X\sin(a_2+st)$ |
| $W_0+m+s$ . . . | $\frac{2}{\pi}sS_3\cos X\sin(a_3+st)$ |
| $W_0+m-s$ . . . | $\frac{2}{\pi}sS_4\cos X\sin(a_4+st)$ |
| $W_0-m+s$ . . . | $\frac{2}{\pi}sS_5\cos X\sin(a_5+st)$ |
| $W_0-m-s$ . . . | $\frac{2}{\pi}sS_6\cos X\sin(a_6+st)$ |
| $W_0+2m+s$ . . . | $\frac{2}{3\pi}sS_7\cos X\sin(a_7+st)$ |

If it is again assumed that the phase angles are chaotically divided and, moreover, that the phase deviation of the active signal may also be conceived to be chaotically divided in these terms, the average energy of the detected interference signal is found to be:

$$\frac{1}{4}s^2S_1^2+\frac{1}{4}s^2S_2^2+\frac{1}{\pi 2}s^2S_3^2+\ldots=$$

$$s^2S^2\left(\frac{1}{2}+\frac{4}{\pi 2}+\frac{4}{9\pi 2}+\frac{4}{16\pi 2}\cdots\right)=s^2S^2$$

the average amplitude of $S_i$ being postulated to be equal to S.

The first term in the second progression corresponds to the frequency range located around the central frequency, the next terms to frequency ranges which are spaced from the central frequency by values of 1*x*, 3*x*, etc., times the average frequency *m*. As is known those frequencies of a frequency-modulated oscillation with a great frequency sweep relatively to the intermediate frequency occur with the highest amplitude, which are far remote from the central frequency. According to the invention the frequency bands corresponding to the first terms of the aforesaid progression are suppressed with the use of the intermediate-frequency band-pass filter 25. A negligibly small distortion is thus introduced, since this suppression of the bands in the proximity of the central frequency comes to the same as if the vectors 0, 1′, 1″, 2′, 2″ . . . corresponding to the central frequency and the first sideband frequencies are added to the initial, frequency-modulated oscillation represented by the rotating vector A in Fig. 7 in phase-opposition. These vectors are shown in a position corresponding with the maximum right-hand and the maximum left-hand frequency sweep. It is evident that the various distortion factors neutralize each other for the major part in regard to their effect. Owing to the said suppression the detected interference signal can be materially reduced, since by omitting the first term only an interference signal of 0.09 $s^2S^2$ remains, and by omitting the two following terms only 0.033 $s^2S^2$ remains.

According to the modulation method indicated the modulating oscillation which determines the frequency sweep of the transmitted oscillations is formed by an intermediate-frequency oscillation modulated in amplitude with the signal to be transmitted, as shown in Fig. 3*a*. Both at the transmitter end and at the receiver end of the transmission system band-pass filters 4 and 20 are provided respectively, so that the emitted spectrum need only occupy the ranges 29 and 30 of Fig. 3*a* which slightly exceed the frequency-difference between the amplitudes corresponding to the smallest and to the greatest amplitude of the frequency-modulating intermediate frequency. These ranges are symmetrical with respect to the mixing frequency produced by the oscillator 15, so that in this receiving circuit-arrangement image-frequency transmitters need not be taken into account. It furthermore appears that a neighbouring transmitter which is modulated in the same manner as shown in Fig. 3*a*, does not affect the detected signal if the receiving set tuned to the main transmitter passes a small part of the spectrum radiated by this neighbouring transmitter, which part is symmetrical relatively to the carrier-wave frequency of this transmitter.

It may be advantageous to modulate the frequency-modulating intermediate-frequency oscillation only unilaterally in amplitude so that the radiated frequency-modulated oscillation exhibits a shape corresponding to that of Fig. 3*c*. If these oscillations are mixed with an oscillation $W_0$ of constant frequency in the mixing stage 12 of the receiver shown in Fig. 4, the "non-modulated" frequency swing 31 of the oscillation remaining smaller than the smallest modulated frequency-swing 32, the interference frequencies in the "non-modulated" band, with the use of a peak voltage detector 22, will not contribute to the detected interference signal, with the result that the signal-to-noise ratio is again improved by a factor 2. Furthermore, the band occupied by the non-modulated band is of a smaller width than in the modulation method according to Fig. 3*a*.

As a numerical example may serve a frequency-modulation transmission system, of which the radiated oscillation has a central frequency W of 40 megacycles/seconds (wavelength 7.5 m.); the average frequency swing due to an intermediate-frequency modulating oscillation *m* of 30 kc./s. is 2 mc., and this frequency swing, owing to the instantaneous value of the audio-frequency signal to be transmitted, varies between approximately 1.9 and 2.1 mc./s. By conversion with the use of an oscillation of 40 mc./s. produced by the oscillator 15 the intermediate-frequency amplifier of the receiver must consequently be equipped with an intermediate-frequency band-pass filter having a tuning frequency of 2 mc./s. and a band-width of well over 200 kc./s.

The circuit-arrangement described permits inter alia of using frequency negative feed-back according to any of the conventional methods which may, moreover, be combined with automatic frequency readjustment.

Figures 8 and 9 illustrate a radio-transmission system which is characterized in that the bandwidth of the radiated spectrum need only be half that occupied by a customary amplitude-modulation transmitter, and with the same power of the transmitter i. e. the same maximum value to which the output tube is swung out, the mean signal-to-noise ratio in the receiver can be improved, for example, by a factor 8. In Fig. 8 A represents a transmitter and B an associated receiver for the transmission of electrical oscillations. After amplification, the audio-frequency oscillations to be transmitted are supplied through input terminals 1—1 to a modulator stage, for example an amplitude-modulation stage 2, in which a local oscillation 3 of, say, 30 kc./s. is modulated with the input oscillations. Subsequently, one sideband of the oscillation produced is suppressed in a filter 4 in known manner.

If the one side-band signal thus produced, upon mixing in the mixer stage 5 with the high-frequency oscillation 6, is radiated and linearly detected in the receiver, the disadvantage arises that the reception is considerably distorted even with a modulation depth of only 40%. As has been proposed, this distortion can be reduced by providing the receiver with a detector 7 which exhibits an even-power characteristic curve, preferably a quadratic characteristic curve. In this event it is found that the amplitudes with which the initial audio-frequencies are reproduced are undistorted, but the cross-modulation products obtained by detection persist to the same extent.

According to the invention the frequency spectrum is intentionally distorted and adapted to the particular type of detector in such manner that quadratic detection of this frequency-spectrum yields the undistorted audio-frequency signal. This may, for example, be achieved in a manner which is also known in circuit-arrangements for reducing non-linear distortion of amplitude-modulated oscillations and in those for reducing non-linear distortion of frequency-modulated oscillations. The measure consists in that the spectrum produced is detected in the same manner as in the receiver, consequently with the use of a quadratic detector 8, the low-frequency output oscillations of this detector being subsequently made operative in the mixer stage 2, for example through a transformer 9 in phase-opposition to the input oscillations 1—1. With sufficient negative feed-back, for example 40 times, this output signal of the detector 8 is substantially identical with the input signal. The output signal of the detector 7 forming part of the receiver B, by which the same high-frequency spectrum is detected as by the detector 8, will consequently also be substantially identical with the input signal.

To reduce the loss of amplification the difference between the oscillation fed to the terminals 1, 1 and part of the output of the quadratic detector 8 may be pre-amplified and this amplified oscillation together with the input oscillation may be supplied to the input of the modulator stage 2.

As a quadratic detector use may, for example, be made of a tube comprising two control-grids to which the same signal to be detected is supplied. If the characteristic curve of this tube is exactly bilinear, so that $i_a=Sv_{g1}\cdot v_{g3}$, the low-frequency component of the anode current will exactly be proportional to the square of the voltage $v_{g1}=v_{g3}$ to be detected. As an alternative, two signals modulated in the same manner and exhibiting a constant frequency difference may be supplied to the two grids, an oscillation of the difference frequency and of which the modulation is proportional to the square of the input oscillations being produced in the anode circuit of the discharge tube.

If the detector used is a tube having one control-grid, and the anode-current characteristic curve has the form $i_a=a(v_g+b)^n$ it can be shown that for a very definite value of a positive or negative low-frequency feed-back 10 included, for example, in the cathode-circuit a substantially exact quadratic relation is established between the anode current and the voltage to be detected. With the use of such a feed-back 10 the non bilinear characteristic curve of a two-control grid tube can also be improved.

According to the invention the carrier-wave of the spectrum produced is, moreover, suppressed. This may, for example, also be effected by means of the filter 4. As an alternative, for example, part of the voltage produced by the oscillator 3 may be added in phase-opposition to the output voltage of filter 4, as is diagrammatically shown by the line 19. Finally, use may, for instance, be made of a method as described in Dutch patent specification 156,738, in which the oscillation produced is fed to the series-combination of a diode and an impedance having a suitable value. This measure results in that on the one hand the absolute value of the amplitudes of the sideband frequencies increases, owing to which a greater ratio between this sideband frequency—i. e. the useful signal—and the noise frequencies is obtained, and on the other hand with a maximum input signal, provided that the carrier-wave is not excessively suppressed, the associated output signal of the filter 4 has a lower value, so that a higher final amplification is possible before the output stage 11 of the transmitter is swung out to the same maximum permissible value.

The measure of suppressing the carrier-wave of a one sideband transmitter is generally known per se. In this case, however, it is required to provide the receiver with means by which this carrier-wave is again amplified to its initial value, so that the initially not suppressed signal is again formed without distortion. These means, which usually comprise automatic frequency-control, render the receiver expensive. By the measure proposed the receiver B is not rendered more expensive than a conventional receiver for amplitude-modulated oscillations. It comprises an identical input mixing stage 12 with local oscillator 15 and an identical low-frequency stage 14, the intermediate-frequency amplifier of the amplitude-modulation receiver being, for instance, replaced by a quadratic detector 7 which need not comprise a greater number of tubes.

Hereinafter it will be shown that a quadratic spectrum corresponding with a definite low-frequency input signal is unambiguous, but for the amplitude $A_0$ of the carrier-wave frequency and that a decrease of this amplitude relatively to the value usually employed in amplitude-modulation leads to a greater signal-to-noise ratio. Assuming the low-frequency input signal to comprise the components:

$$\{z_1 \cos (gt+1) + z_2 \cos (2gt+2) + \ldots z_n \cos (ngt+n)\}$$

so that it is taken, for the sake of simplicity, that the oscillation is periodic with the frequency $g$, for which an arbitrarily low value may be chosen.

The quadratic spectrum produced will then be:

$$Q = A_0 \cos W_0 t + A_1 \cos \{(W_0+g)t+X_1\} + A_2 \cos \{(W_0+2g)t+X_2\} + \ldots A_n \cos \{(W_0+ng)t+X_n\}$$

Quadratic detection of this spectrum yields a low-frequency signal equal to $$A_0A_1 \cos (gt+X_1) + A_1A_2 \cos (gt+X_2-X_1+ \ldots A_n-1A_n \cos (gt+X_n-X_{n-1}) + A_0A_2 \cos (2gt+X_2) + A_1A_3 \cos (2gt+X_3-X_1) + \ldots A_{n-2}A_n \cos (2gt+X_n-X_{n-2}) + A_0A_3 \cos (3gt+X_3) \ldots + \ldots + A_0A_n \cos (ngt+X_n)$$

Assuming the negative feed-back to be such that this detected signal is identical with the input signal, then we have $2n$ equations between $n+1$ unknown $A_0 \ldots A_n$, the $n$ unknown $X_1 \ldots X_n$ and the known values $z_1 \ldots z_n$ and $1 \ldots n$. In the vector algebra they may be reproduced by $$z_i \cos (igt+1) = \sum_{k=0}^{n-i} \bar{A}_k \cdot \bar{A}_{k+i}$$

To these $2n$ equations another must be added, in which the value of $A_0$ is expressed, since $A_0$ is not influenced by the negative feed-back; the value is determined by the grid-adjustments of the tube 2, by the amplitude of the local voltage 3 and by any attenuation by the filter 4. Assuming for the sake of simplicity that there is only one modulating frequency $p$ with an amplitude $a$, the oscillations $A_0 \cos W_0t + A \cos (W_0+p)t$ in which $A_0A = z$ are produced in the associated quadratic spectrum (Fig. 9), the negative feed-back making that suppression of $A_0$ leads automatically to an increase of A. Interference frequencies $W_0+s$, $W_0+p-s$ and $W_0+p+s$, in which $s$ is smaller than half the bandwidth P of the transmitted band, may give rise to a detected interference signal with a frequency $s$, the value of which is given by:

$$A_0S_1 \cos (st+a_1) + AS_2 \cos (st+a_2) + AS_3 \cos (st+a_3)$$

in which $S_1 \ldots S_3$ are the amplitudes and $a_1 \ldots a_3$ the phases of this noise frequency. If the average amplitude is assumed to be S and the phase to be divided chaotically, it follows that the average noise energy with a frequency $s$ is $(\frac{1}{2}A_0^2+A^2)S^2$. Due to noise frequencies $s$ exceeding half the bandwidth $p$ of the transmitted band this expression becomes equal to $\frac{1}{2}(A_0^2+A^2)S^2$. In general the latter expression holds, since the first expression only applies to frequency values S of the noise frequency lower than those of the useful signal $p$. Consequently, a greater influence of interferences holds only for the low audio-frequencies S, it being considered that the average amplitude of these frequencies is higher, whereas with more than one modulation frequency in general the total energy of the useful signal increases more than the noise-frequency energy. For the signal-to-noise ratio we thus have $$\frac{A_0^2 \cdot A^2}{\frac{1}{2}(A_0^2+A^2)S^2}$$

in which $A_0A = z =$ a given value.

If this amplitude $A_0$ is adjusted to the value $A_0 = A$ with which the signal-to-noise ratio is a maximum, the highest value C to which the transmission stage would be swung out with a constant value $A_0A$ for the useful signal has also decreased, since this value is proportional to $A_0+A$.

Supposing the maximum permissible modulation depth with a two-sideband amplitude-modulated transmitter to be 80% i. e. $A_{max} = \frac{4}{5}A_0 = \frac{4}{7}C$ we have for the signal-to-noise ratio:

$$\frac{(5/7)^2 \cdot (4/7)^2}{(5/7)^2 + (4/7)^2} \times \frac{C^2}{S^2} = \frac{2}{29}\frac{C^2}{S^2}$$

With the method according to the invention, however, $A_{max} = A_0 = \frac{1}{2}C$ and, moreover, half the bandwidth involves half the noise energy. The signal-to-noise ratio now becomes $$2 \cdot \frac{(\frac{1}{2})^2 \cdot (\frac{1}{2})^2}{(\frac{1}{2}) + (\frac{1}{2})^2} \times \frac{C^2}{S^2} = \frac{1}{4}\frac{C^2}{S^2}$$

which is well over 3.5 times better.

For weak signals much better values are found; particularly favorable values are found if the amplitude $A_0$ of the carrier-wave frequency is caused to vary in accordance with the envelope of the audio-frequency signal, so that the condition $A_0 = A$ is invariably fulfilled. This may, for example, be achieved by applying to a grid of the tube 2 a voltage which is proportional to the envelope of the input oscillations supplied to the terminals 1 as shown, for instance, in Fig. 8 by the diode 26 and the grid leak resistance 27.

As an alternative, the amplitude of the oscillations produced by the oscillator 3 may be caused to vary in accordance with the envelope of the audio-frequency signal. For 40% and 20% modulation percentage, with which for a conventional amplitude-modulated transmitter holds: $A_0 = \frac{5}{7}C$, $A = \frac{1}{7}C$ and $A = \frac{1}{14}C$ respectively, signal-to-noise ratios of approximately $$\frac{1}{50}\frac{C^2}{S^2}$$

and approximately $$\frac{1}{200}\frac{C^2}{S^2}$$

are found respectively, whereas the means according to the invention, with which $A_0 = A =$ approximately $\frac{7}{20}$ and $\frac{1}{4}$ C respectively, yield the values $$\frac{1}{8}\frac{C^2}{S^2}$$

and $$\frac{1}{16}\frac{C^2}{S^2}$$

respectively for the corresponding signal-to-noise ratios, i. e. 6 and 12 times better respectively.

Consequently, for an average modulation percentage of 30% the reception to be expected is approximately 8 times better than with the conventional two-sideband transmitters, whilst only half the bandwidth need be occupied without the need for means rendering the receiver costly.

In the transmission system shown in Fig. 8 it is taken that the band-pass filter included in the output circuit of the mixer stage 12 will not introduce distortion. As a rule, however, this invariably holds for the "marginal" frequencies of the incoming spectrum which then also include the carrier-wave frequency. This distortion may be avoided by including a similar filter 25 in the quadratic negative feed-back circuit of the transmitter.

It will in general be possible to produce the desired even power spectrum, more particularly the desired quadratic spectrum, in a manner different from that as described, by using a combination of amplitude-, phase- or frequency-modulators with a limited modulation percentage and a definite, prescribed modulation-characteristic curve of filters cutting off a definite part of the spectrum produced.

It may be advantageous to distribute the radiated energy among a plurality of bands. For example, the audio-frequency signal may be supplied as a modulating oscillation to an amplitude- or phase-modulator 2 having a small modulation depth, the central frequency being suppressed, for example by a counter-phase voltage operating across the lead 19, and subsequently the spectrum produced is detected with the use of a detector having an even power characteristic curve, more particularly a quadratic detector 8, whereupon the detected signal passes through a filter which does not allow the passage of frequencies exceeding the highest audio-frequency to be transmitted, and is then fed to the modulator stage 2, for example through a transformer 9 and in phase opposition to the input oscillations.

What I claim is:

In a radio communication system, transmitting apparatus comprising means to generate an oscillation having a given frequency, an input signal source having a given frequency band and a given envelope, a modulating stage having input and output means, a detecting stage having a substantially quadratic characteristic, means to apply said oscillation and said input signal to the input means of said modulating stage to produce a first intermediate frequency wave having a carrier frequency and upper and lower sideband components, means to suppress one of said sideband components to a negligible value, means to suppress said carrier frequency to a value corresponding to the envelope of said input signal to produce a single sideband wave, and means intercoupling the output of said modulating stage through said detected stage to the input of said modulating stage in a negative feedback relationship.

References Cited in the file of this patent

UNITED STATES PATENTS

| Number | Name | Date |
|---|---|---|
| 1,745,415 | Green | Feb. 4, 1930 |
| 1,907,109 | Hinton | May 2, 1933 |
| 1,984,451 | Bailey | Dec. 18, 1934 |
| 2,070,666 | Llewellyn | Feb. 16, 1937 |
| 2,129,020 | Murphy | Sept. 6, 1938 |